J. KOENIG.
DEVICE FOR RAISING AND SUPPORTING AUTOMOBILES.
APPLICATION FILED MAY 14, 1915.

1,170,280.

Patented Feb. 1, 1916.
2 SHEETS—SHEET 1.

Witnesses
L. B. James
S. Friedman

Inventor
Joseph Koenig
By Mansell & Mills.
Attorney

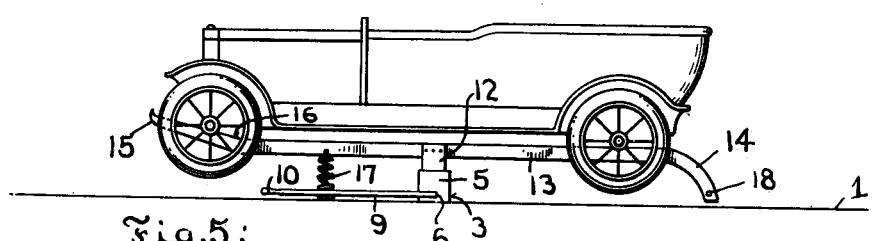
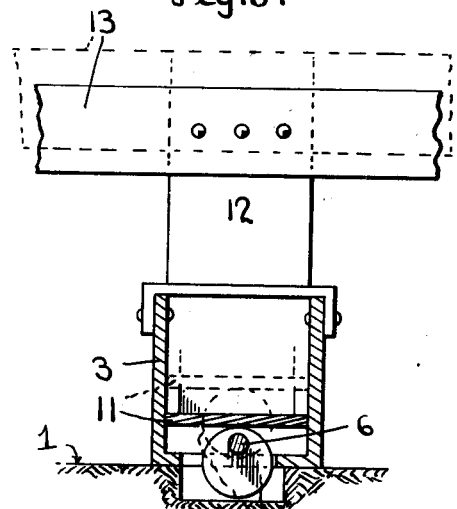
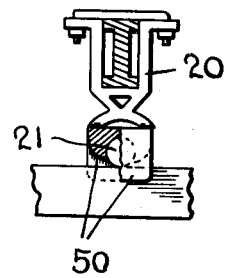
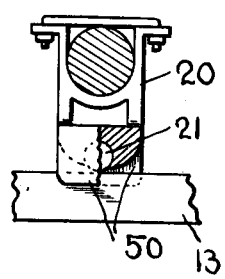
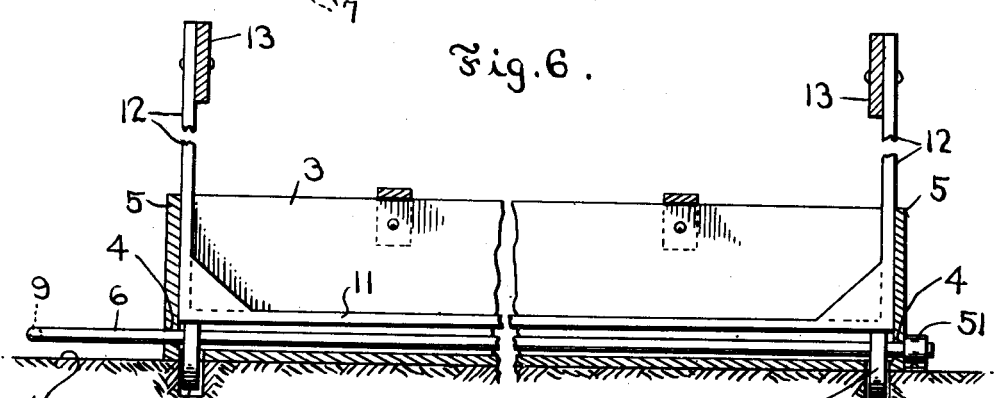

UNITED STATES PATENT OFFICE.

JOSEPH KOENIG, OF SPRINGFIELD, MISSOURI.

DEVICE FOR RAISING AND SUPPORTING AUTOMOBILES.

1,170,280.    Specification of Letters Patent.    Patented Feb. 1, 1916.

Application filed May 14, 1915. Serial No. 28,130.

*To all whom it may concern:*

Be it known that I, JOSEPH KOENIG, a citizen of the United States, residing at Springfield, in the county of Greene and State of Missouri, have invented certain new and useful Improvements in Devices for Raising and Supporting Automobiles, of which the following is a specification.

This invention relates to devices for supporting vehicles and more particularly automobiles, and has for its special object the provision of a device that can be operated by the automobile's own power and when elevated will leave the wheels of the automobile free from the ground or floor thereby taking the strain and weight of the automobile off of the tires, and which by a simple and effective lever mechanism may be lowered so that the rear or drive wheels will rest upon the ground or floor and permit of the automobile being quickly removed from the support by merely applying its power as for an ordinary backward movement.

Another object of my invention is to provide a device of this character which in addition to performing the function of a support may also be used as a jack when it is desired to raise the vehicle from the ground for the purpose of removing the wheels or getting at its underneath parts.

A further object is to provide a device of the character described of such construction that it will automatically stop an automobile when driven into a garage, thus preventing the machine colliding with the walls and damaging either or both the machine and garage.

Figure 1:
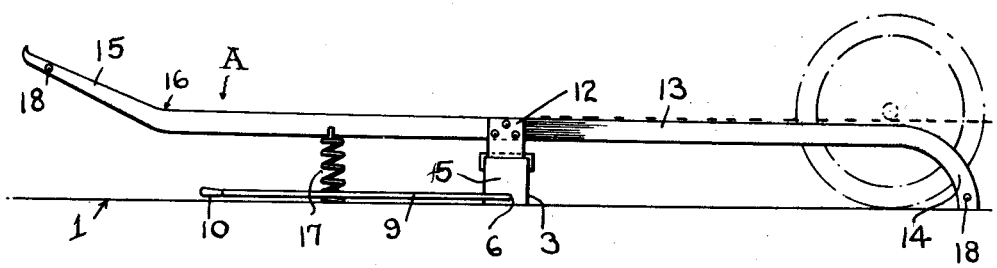
Figure 2:
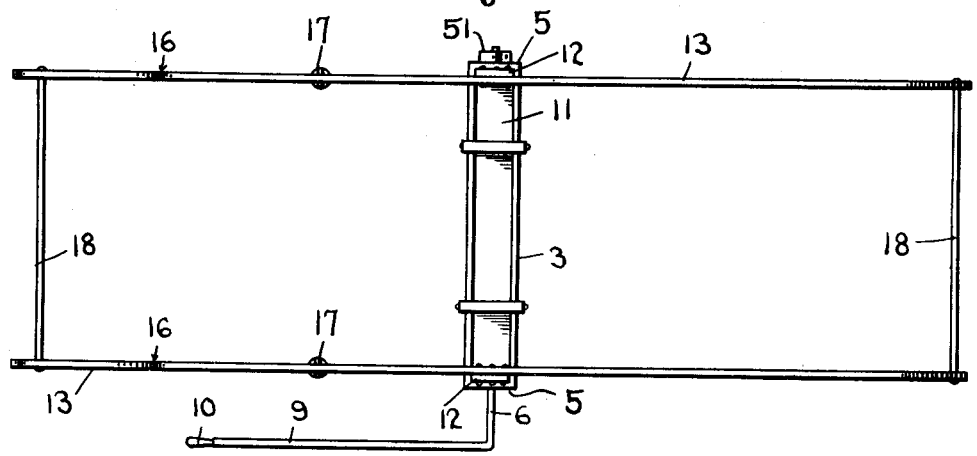
Figure 3:
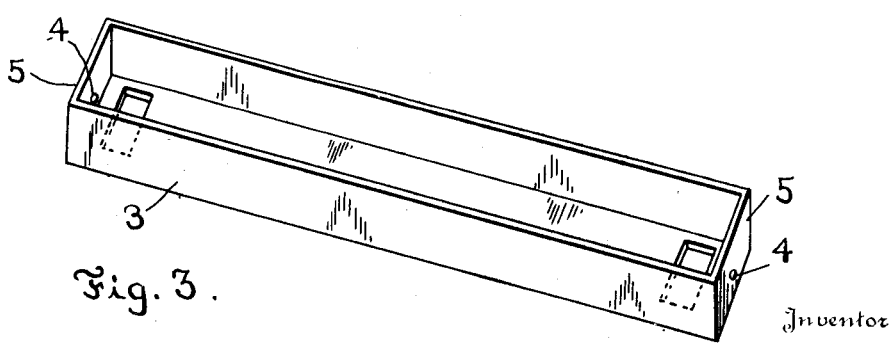

Other objects and advantages such as simplicity, durability, efficiency, and the general improvement of the art will be brought out in the following specification and illustrated in the accompanying drawings, in which:

Figure 1 is a side elevation of the device in its initial position. Fig. 2 is a top plan view of the device. Fig. 3 is a detail perspective view of the base of my device. Fig. 4 is a side view of the device elevated and showing an automobile in position. Fig. 5 is a cross-sectional view of my device, at approximately the center of the base member partly broken away. Fig. 6 is a transverse sectional view showing the interior of the hollow base member and the position of the cams when the device is in its lowermost position. Figs. 7 and 8 are views of clips, adapted to be secured to the axles of vehicles to facilitate their movement on my improved device, said clips being broken away to show the rollers, and Fig. 9 is a detail showing the coil spring controlling the lever for lowering the device.

Referring to the drawings by reference character, the numeral 1 designates the floor of a garage and as shown in Fig. 5 a rectangular hollow member 3 is rigidly supported thereon. As shown in Fig. 3 the ends 5 of the rectangular hollow member 3 are provided with perforations 4, and extending longitudinally of the hollow member 3 is a shaft 6. Mounted interiorly of the hollow member 3 and rigidly secured to the shaft 6 are cams 7, the cam face of which is adapted to be received in recesses in the floor when in the lower position. One end of the shaft 6 is bent at right angles to the body portion to form an operating lever 9 the upper end of which is provided with an operating handle 10.

Slidably mounted within the hollow rectangular member 3 is a substantially U-shaped member 11 which has vertically extending standards 12, and the bottom face of the U-shaped member lies in contact with the cams 7 and is adapted to be supported thereby.

Secured to the upper edge of each of the legs of the U-shaped member is a bar 13 the rear end of each of which is bent downwardly as at 14, and the front ends thereof are bent upwardly as at 15, to form a recess 16 at the point at which the upwardly inclined end begins.

Mounted on each of the side bars 13 and engaging the floor of the garage is a coil spring 17 the purpose of which will be hereinafter described. As shown in the top plan view in Fig. 2 the side bars 13 are connected at their ends by brace rods 18.

The operation of the device is as follows: The vehicle is driven onto the rectangular frame by a forward movement under its own power, the axles engaging the top of each of the bars 13, and when the vehicle has gone forward sufficiently for the axles of the wheels to engage in the recesses 16 the weight of the vehicle will rock the side bars 13 in the direction of the arrow A in Fig. 1 and thus raise the rear wheels and leave all of the wheels clear of the ground or floor. With the bars in this position the weight of the forward end of the vehicle is supported by the coil springs 17.

To return the vehicle to the ground or floor it is only necessary to rock the cams 7 by throwing the lever 9 which will lower the rear wheels to the ground or floor when the vehicle may be backed off by its own power. When the support is free of the vehicle the coil springs 17 raise it automatically into position for further use.

In the modified form shown in Fig. 7 the clip 20 is provided which may be secured to each of the axles of the automobile, the lower end of said clip having rotatably mounted therein a roller 21 which is adapted to engage with the upper edge of the side bars 13. In Fig. 8 is shown a similar clip especially adapted for use on cars which employ axles, circular in cross section.

In each of the modified forms shown in Figs. 7 and 8, plates 50 are provided to aid in guiding the vehicle and maintaining the same in place on the bars 13.

Having thus described the invention what is claimed and desired to protect by Letters Patent is:

1. A device of the character described comprising a rectangular frame, a U-shaped member depending from said rectangular frame and adapted to form the pivot point thereof, means for resiliently supporting the front end of the rectangular frame, a plurality of cams engaging said U-shaped member and means for operating the cams to elevate the rectangular frame.

2. A device of the character described comprising a vertically movable rectangular frame pivotally mounted and having its forward end inclined upwardly and its rearward end inclined downwardly, resilient means for supporting the frame in front of its pivoted point, and a plurality of cams for vertically raising said rectangular frame.

3. A device of the character described comprising a rectangular frame, a U-shaped member depending from said rectangular frame and adapted to form the pivot point thereof, said frame and U-shaped member being vertically movable, means for resiliently supporting the front end of said frame, a plurality of cams engaging said U-shaped member for causing said vertical movement and means for operating said cams.

4. A device of the character described comprising a pair of side bars spaced apart, said bars having their forward ends bent upwardly and their rear ends bent downwardly, a pair of braces joining said side bars, and a U-shaped member secured to said side bars, said U-shaped member being pivotally mounted on cams within a hollow base member.

5. A device for raising automobiles from garage floors comprising a hollow rectangular member rigidly secured to said floor, rectangular slots adjacent the ends of said member and recesses in line with said slots, a shaft mounted in said rectangular member, cams mounted on said shaft, a U-shaped member mounted within said rectangular member on said cams, having its standards extending upwardly, side bars secured to said standards, said side bars being spaced apart by braces at their ends, springs under said side bars forward of their center, and an operating lever on said shaft.

6. A device of the class described comprising a hollow rectangular member rigidly secured to a garage floor, a shaft mounted in said member, cams mounted on said shaft, a U-shaped member mounted within said rectangular member, having its standards extending upwardly, side bars secured to said standards, and braces connecting and spacing said side bars adjacent their ends.

7. A device of the class described comprising a hollow base member, a U-shaped member slidably mounted in said hollow base member, a pair of side bars secured to said U-shaped member, and a plurality of cams mounted on a shaft within said hollow member adapted to raise said U-shaped member.

In testimony whereof I affix my signature in presence of two witnesses.

JOSEPH KOENIG

Witnesses:
S. L. CRAIG,
ED. C. BAUMANN.